(No Model.)
H. COCHRAN.
SIGNAL LIGHT.
No. 479,164.        Patented July 19, 1892.
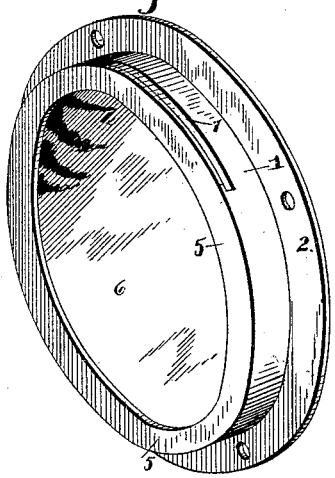
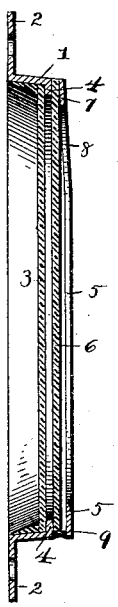
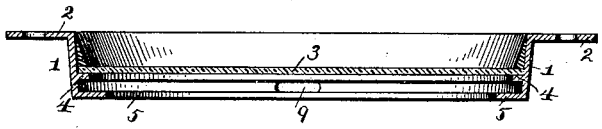
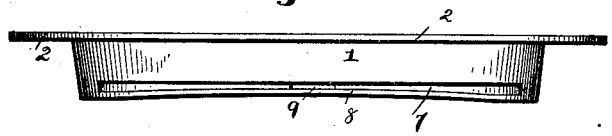
Witnesses
Chas. A. Ford.
H. J. Riley
Inventor
Henry Cochran.
By his Attorneys,
C. A. Snow & Co.

UNITED STATES PATENT OFFICE.

HENRY COCHRAN, OF CHESTER, PENNSYLVANIA.

SIGNAL-LIGHT.

SPECIFICATION forming part of Letters Patent No. 479,164, dated July 19, 1892.

Application filed December 3, 1891. Serial No. 413,862. (No model.)

*To all whom it may concern:*

Be it known that I, HENRY COCHRAN, a citizen of the United States, residing at Chester, in the county of Delaware and State of Pennsylvania, have invented a new and useful Signal-Ring, of which the following is a specification.

The invention relates to improvements in signal-lights for street-cars and the like.

The object of the present invention is to provide a ring or casing designed to be placed in front of a lamp to display a light and capable of receiving a supplemental colored glass, which is usually employed to designate the route of a car and of enabling the colored glass to be readily changed when it is desired to place a car on a different route or for other reasons.

The invention consists in the construction and novel combination and arrangement of parts hereinafter fully described, illustrated in the accompanying drawings, and pointed out in the claim hereto appended.

In the drawings, Figure 1 is a perspective view of a signal-light ring or casing constructed in accordance with this invention. Fig. 2 is a vertical sectional view. Fig. 3 is a horizontal sectional view. Fig. 4 is a top view, the supplemental glass being removed.

Like numerals of reference indicate corresponding parts in all the figures of the drawings.

1 designates a signal-light ring or casing designed to be placed before a lamp to display a signal-light in the usual manner—such as on street-cars to designate the route of a car—and the said ring or casing may be employed as a head-light or be placed on any portion of the car, as desired. The ring or casing 1 is provided at its inner edge with an annular flange 2, which is perforated and is secured to a car or the like by screws passing through the perforations. Within the ring is secured a stationary white glass or pane 3, which is designed to display a white light. The stationary white glass 3 fits against a flange 4 and is secured within the ring by putty or the like. The front of the ring or casing is provided at its periphery with a flange 5, which is L-shaped in cross-section and forms, with the flange 4, a way or pocket to receive a supplemental colored glass 6 and is provided at the top of the ring or casing with a slot 7, which forms a mouth or opening for the pocket to enable the supplemental glass to be readily inserted in the ring or casing or removed therefrom. The supplemental glass may be of any desired color, and it enables the signal-light to be changed from white to any desired color to indicate the route of the car, and when it is desired to change the route of the car the supplemental glass may be changed to display the proper light to indicate the new route of the car. The portion 8 of the L-shaped flange 5, formed by the slot or opening 7, possesses sufficient spring to clamp the supplemental glass and securely retain the same in place without the aid of additional spring or other fasteners. This construction prevents the supplemental glass or pane being jolted out of the ring or casing and becoming lost or broken should the car pass over a slight obstruction on the track or should it get off the track. The bottom of the L-shaped flange 5 is provided with an opening 9 to permit water to drain from the casing and to prevent accumulation of water should the signal ring or casing be employed as a head-light or be placed in another unsheltered position on a car.

It will be seen that the signal-light ring or casing is exceedingly simple and inexpensive in construction; that it enables the color of the light displayed to be readily changed when desired, and that it securely holds the supplemental pane or glass in position.

What I claim is—

A signal-light ring or casing having a stationary glass or pane arranged within the same and provided in front of the stationary glass or pane with an L-shaped flange forming a pocket and having in its top a slot to provide a mouth or opening, said pocket being adapted for the reception of a supplemental glass or pane, and the portion 8, formed by the slot or opening, being resilient and adapted to clamp the supplemental glass, substantially as described.

In testimony that I claim the foregoing as my own I have hereto affixed my signature in the presence of two witnesses.

HENRY COCHRAN.

Witnesses:
  CASPER HOWARTT,
  JO. H. HINKSON.